United States Patent [19]

Huang

[11] Patent Number: 5,322,000

[45] Date of Patent: Jun. 21, 1994

[54] MATERIAL HOLDING AND GUIDING DEVICE OF AUTOMATIC LATHE

[76] Inventor: Ching-Fu Huang, No. 12, Hengching Lane, Yuanchung Village, Fuhsing Hsiang, Changhua, Taiwan

[21] Appl. No.: 120,365

[22] Filed: Sep. 14, 1993

[51] Int. Cl.⁵ .................. B23B 13/02; B23B 13/08
[52] U.S. Cl. .................................. 82/127; 82/163; 414/14
[58] Field of Search ............. 82/126, 127, 163, 164; 414/14

[56] References Cited

U.S. PATENT DOCUMENTS

| | | | |
|---|---|---|---|
| 962,829 | 6/1910 | Girard | 82/163 |
| 3,874,520 | 4/1975 | Scheler | 82/127 |
| 3,933,062 | 1/1976 | Huber | 82/163 |
| 4,700,593 | 10/1987 | Cucchi | 82/163 |
| 4,914,993 | 4/1990 | Fabbri | 82/127 |

*Primary Examiner*—William E. Terrell

*Attorney, Agent, or Firm*—Browdy and Neimark

[57] ABSTRACT

A material holding and guiding device of automatic lathe has a base with one end provided with an arm frame and another end provided with a reciprocating set. A receiving and retaining set is mounted pivotally on the arm frame in a manner that the bottom of the receiving and retaining set is coupled with the reciprocating set. The receiving and retaining set has an inner annular body and an outer annular body. The inner annular body is axially provided with a through hole which is used to accommodate therein the material to be lathed and which is provided at each of two ends thereof with a ring sleeve. The motion of the reciprocating set causes the receiving and retaining set to make a swing of a predetermined angle so as to force the ring sleeves located at both ends of the through hole of the inner annular body to hold the material stably in a manner that the material is capable of turning synchronously with the inner annular body.

3 Claims, 3 Drawing Sheets

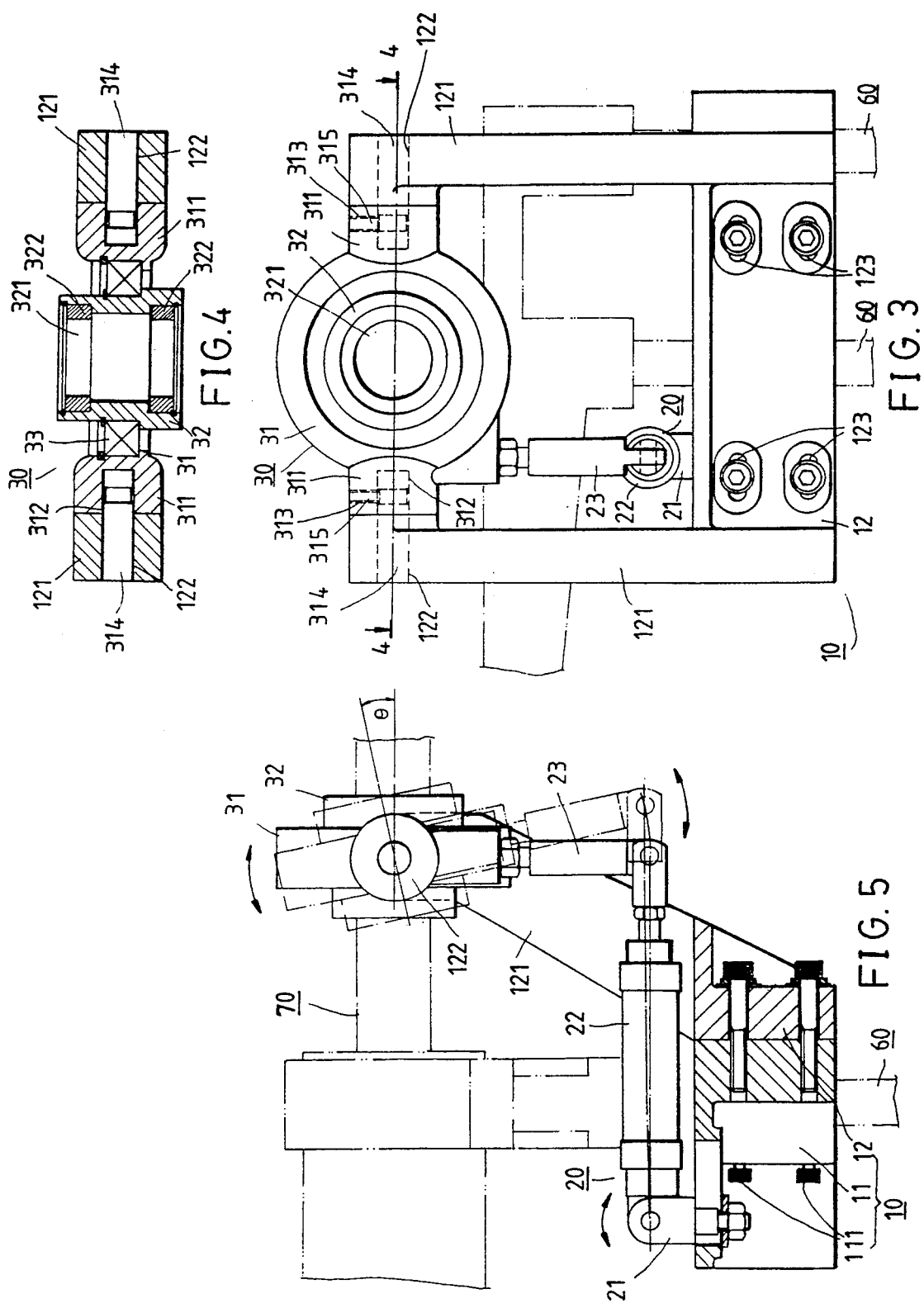

MATERIAL HOLDING AND GUIDING DEVICE OF AUTOMATIC LATHE

BACKGROUND OF THE INVENTION

The present invention relates to an auxiliary device of an automatic lathe, and more particularly to a material holding and guiding device of the automatic lathe.

In the conventional process of making a small component part, a specialized bolt or nut, etc., a long and rod-shaped blank material is sent into an automatic lathe in which the material is turned, drilled, and cut to a specified dimension and a specified pattern. Such process is capable of producing economically the component parts in quantity.

As shown in FIG. 1, an elongate rod 1 of blank material is held securely at one end thereof by an automatic lathe 2 and is supported at another end thereof by a material guiding frame 3. As soon as the machining of a work piece is completed, the chuck of the automatic lathe 2 holding the rod 1 is caused to release the rod 1. In the meantime, a rope 4 is activated to pull a pushing rod 5 so that the pushing rod 5 urges the rear end of the rod 1 to cause the front end of the rod 1 to advance, so as to complete the feeding process. However, when the anterior end of the elongate rod 1 is held and turned rapidly by the chuck of an automatic lathe 2 against the edge of a cutting or abrading tool, the middle part and the posterior part of the elongate rod 1 tend to sway, thereby causing the anterior end of the elongate rod 1 to sway slightly. As a result, the quality of the lathed article is greatly undermined. In order to remedy such situation, the elongate rod 1 can be so shortened as to mitigate the incident that the elongate rod 1 sways during the lathing process. However, such remedy often undermines the efficiency of the automatic lathe 2 because the frequency of the stoppage of the automatic lathe 2 for replenishing the elongate rod 1 is increased substantially.

In addition, the rope 4 of the guiding frame 3 is pulled by a weight or a spring so as to cause the pushing rod 5 to push the rod 1 to move forward. As the rod 1 is so pushed by the pushing rod 5 to reach the extreme front end, the rope 4 must be pulled manually to cause the pushing rod 5 to return to its original position at the extreme rear end so as to facilitate another rod to be pushed through. Such operational procedures as described above are rather inconvenient and inefficient.

SUMMARY OF THE INVENTION

It is, therefore, the primary objective of the present invention to provide a material holding and guiding device for use in an automatic lathe. The device is capable of holding a stick material in such a manner that the middle part and the posterior part of the stick material do not sway at such time when the anterior end of the elongate material is held and turned rapidly against a cutting or abrading tool.

It is another objective of the present invention to provide a material holding and guiding device with means enabling the guiding frame to cooperate therewith so as to permit the pushing member to return automatically to its original position at the time when the rod is pushed by the pushing rod to reach the extreme front end.

In keeping with the principle of the present invention, the foregoing objectives of the present invention are attained by a material holding and guiding device of automatic lathe, which comprises a base set, a reciprocating set, and a receiving and retaining set. The base set is mounted on a material guiding frame of the automatic lathe and is provided at one end thereof with an arm and at another end thereof with the reciprocating set. The receiving and retaining set is pivoted to the arm and has a lower portion that is coupled with the reciprocating set. Through the motion of the reciprocating set, the receiving and retaining set is capable of making a swing of a predetermined angle by using the pivoting point of the arm as the center of the circle. The receiving and retaining set has an inner annular body and an outer annular body. Located between the inner annular body and the outer annular body is a bearing enabling the inner annular body to turn in relation to the outer annular body. The inner annular body is axially provided with a through hole whose both ends are provided respectively with a ring sleeve of a soft plastic material. The midsection of a stick material is placed in the through hole of the inner annular body so that the stick material is retained by the two ring sleeves of the inner annular body at such time when the reciprocating set moves on for a predetermined distance to cause the receiving and retaining set to make a turn of a predetermined angle. As a result, the midsection of the stick material does not sway when the anterior end of the stick material is held and turned rapidly by the chuck of the automatic lathe against the cutting tool, so as to ensure that the work piece is lathed with precision.

The foregoing objective, features and functions of the present invention will be more readily understood upon a thoughtful deliberation of the following detailed description of a preferred embodiment of the present invention in conjunction with the accompanying drawings.

BRIEF DESCRIPTION OF THE DRAWINGS

FIG. 3 shows a side elevational view of the present invention.

FIG. 4 shows a sectional view of a portion taken along the line 4—4 as shown in FIG. 3.

FIG. 5 is a schematic view illustrating the present invention at work.

DETAILED DESCRIPTION OF THE PREFERRED EMBODIMENT

Figure 1:
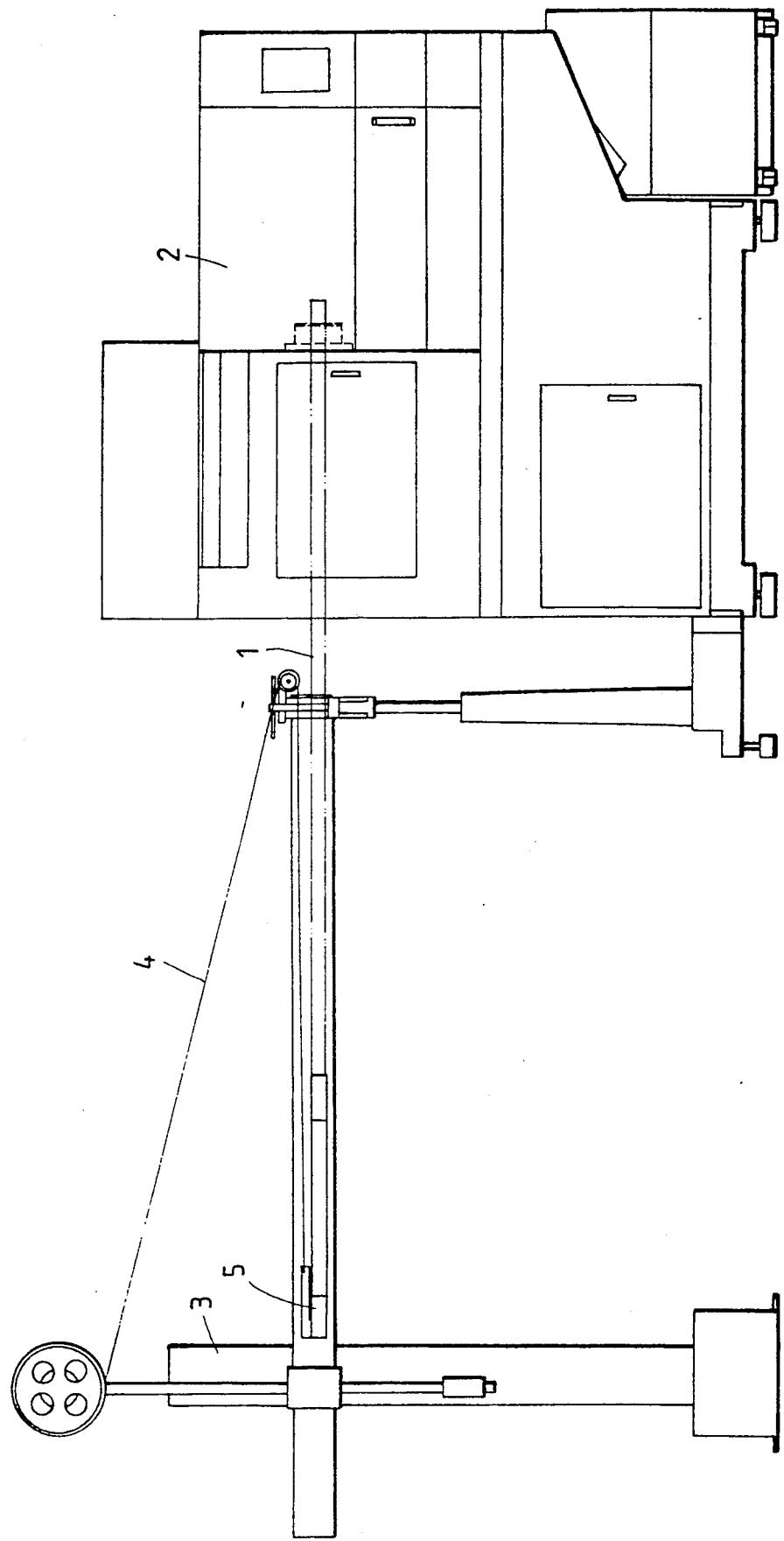
FIG. 1 is a schematic view showing that an elongate rod material is shaped on a lathe according to the prior art.

Referring to FIGS. 2-5, a material holding and guiding device of an automatic lathe of the present invention is shown to be mounted on a material guiding frame 60. The device comprises a base set 10, a reciprocating set 20, and a receiving and retaining set 30.

The base set 10 has a bottom disk 11 and an arm frame 12. The bottom disk 11 is mounted on the material guiding frame 60. The arm frame 12 is provided at lower side thereof with four elongate holes 123 and is fastened to the bottom disk 11. In addition, the arm frame 11 is provided at upper side thereof with two arms 121 corresponding in dimension and location to each other. Each of the two arms 121 is provided with a pivoting hole 122.

The reciprocating set 20 is mounted on a predetermined location of the base set 10 and is provided with a shoulder frame 21 pivoted to one end of a motion cylinder 22 having another end that is coupled with the receiving and retaining set 30 by means of a connection rod 23.

The receiving and retaining set 30 has an outer annular body 31 and an inner annular body 32. Located between the outer annular body 31 and the inner annular body 32 is a bearing 33, which enables the inner annular body 32 to turn in relation to the outer annular body 31 having a lug 311 provided respectively on both sides of the outer annular body 31. Each of the two lugs 311 has a round hole 312 corresponding in location to the pivoting hole 122 of the arm 121. Located over the round hole 312 is a threaded through hole 313. Therefore, the receiving and retaining set 30 can be pivoted to the arm frame 12 by means of a pivoting rod 314 which is received in the pivoting hole 122 of the arm 121 of the arm frame 12 and in the round hole 312 of the lug 311. The pivoting rod 314 is kept securely in place by means of a stop bolt 315, which is driven into the threaded through hole 313. In addition, the inner annular body 32 is axially provided with a through hole 321 having a diameter greater than the diameter of a stick material 70 and having a ring sleeve 322 provided at each of two ends thereof. The ring sleeve 322 is made of an abrasion-resistant, heat-resistant and soft plastic material.

The material guiding frame 60 comprises two support posts 61 and 62 on which a cross rod 63 is mounted. The cross rod 63 is provided thereon with two chain wheels 64A and 64B. The chain wheel 64A operated by a motor 65 is used to drive a chain 66 provided on the upper section thereof with a movable block 67 capable of moving along with the chain 66. The movable block 67 is capable of making contact with two limit microswitches LS1 and LS2 which ar located respectively at the two extreme ends of the cross rod 63. The chain 66 is provided on the lower section thereof with a pushing member 68 capable of moving along with the chain 66. The pushing member 68 is intended for use in pushing forward an elongate stick material 70. The operation of pushing forward the stick material 70 by the material guiding frame 60 is regulated by a control box 69.

Figure 2:
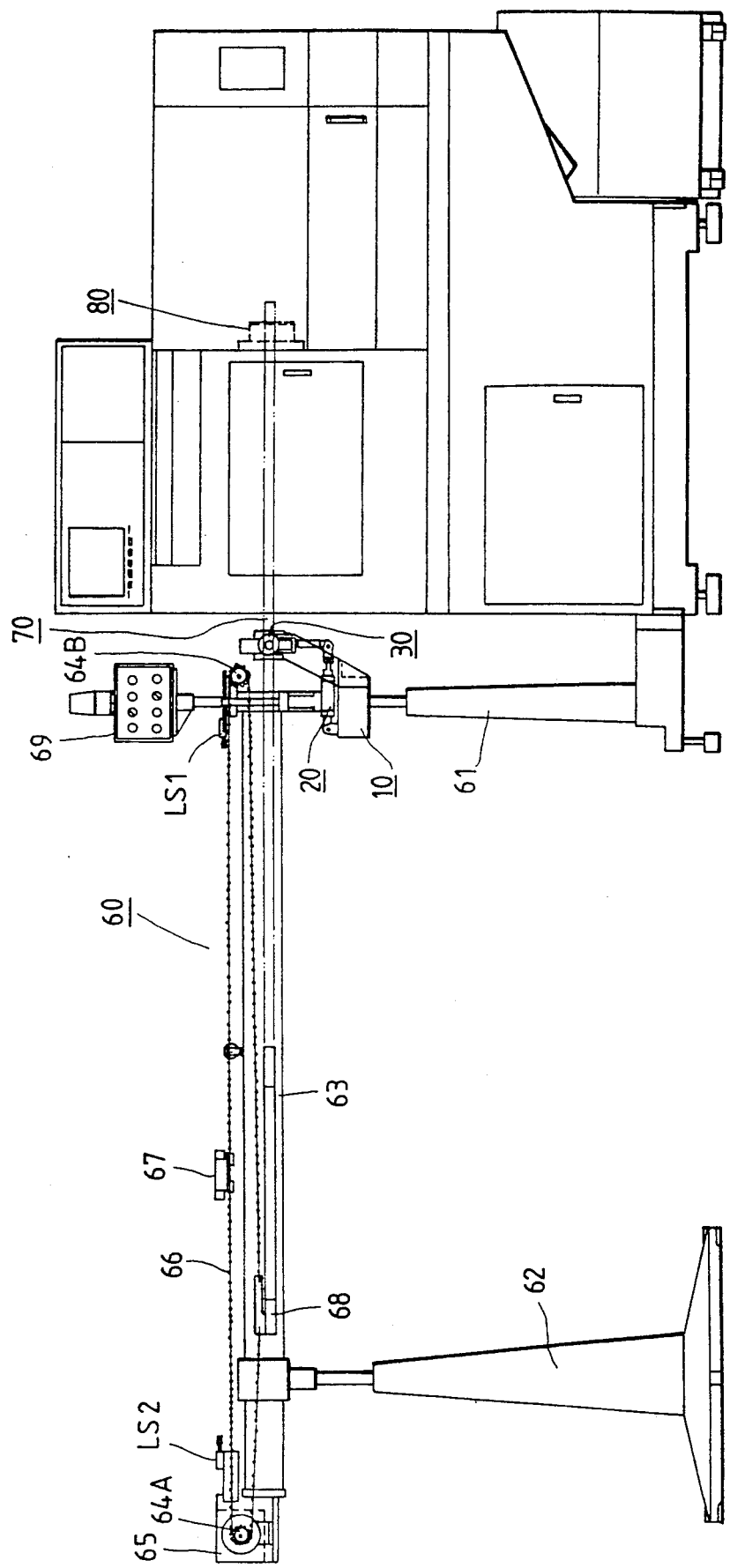
FIG. 2 is a schematic view showing that a stick material is shaped on a lathe according to the present invention.

As shown in FIG. 2, the stick material 70 is put into a chuck 80 of an automatic lathe to pass through the through hole 313 of the inner annular body 32 of the receiving and retaining set 30. Upon being located precisely, the stick material 70 is ready to be lathed. The anterior end of the stick material 70 is held securely by the chuck 80. In the meantime, the motion cylinder 22 of the reciprocating set 20 is activated synchronously to move forward for a predetermined distance when the chuck 80 is made to hold securely the stick material 70. As shown in FIG. 5, the receiving and retaining set 30 is caused to make a swing or a predetermined angle by means of the connection rod 23, so that the inner annular body 32 and the axis of the stick material 70 form a skew angle $\theta$. As a result, two ring sleeves 322 of the inner annular body 32 retain securely "the middle part of the stick material 70. When the stick material 70 is turned rapidly by the lathe against the edge of a cutting or abrading tool, the inner annular body 32 turns synchronously. As soon as a lathed work piece is cut off, the motion cylinder 22 of the reciprocating set 20 is caused to move rearwards so that the chuck 80 begins to loosen the stick material 70, which is then advanced by the material guiding frame 60. As a result, the anterior end of the stick material 70 is once again ready to be lathed.

The motor 65 of the material guiding frame 60 is capable of operating synchronously along with the motion cylinder 22. As the motion cylinder 22 is caused to move rearwards to release the chuck 80, the motor 65 operates to drive the chain 66, which causes the pushing member 68 to move forward to push the posterior end of the stick material 70, which is then caused to advance for a predetermined distance. In general, the motor 65 stops as soon as the anterior end of the stick material 70 touches a baffle. The chuck 80 of the lathe holds firmly the stick material 70 while the motion cylinder 22 acts forward to cause the ring sleeve 322 to hold and guide the stick material 70. When the movable block 67 moves forward along with the stick material 70 and then moves backward to hit the microswitch LS2, the motor 65 begins operating in reverse until such time when the movable block 67 hits another microswitch LS1. As a result, the pushing member 68 is caused to return to its original position so as to permit another stick material 70 to enter the material guiding frame 60.

The material holding and guiding device of automatic lathe of the present invention has two advantages over the prior art, which are expounded explicitly hereinafter.

According to the present invention, the stick material 70 is urged and held by the ring sleeve 322 of soft material. In addition, the inner annular body 32 of the arm frame 12 and the chuck 80 of the automatic lathe are coaxially arranged. Therefore, when the lathing process is under way, the anterior end of the stick material 70 does not sway.

According to the present invention, the inner annular body 32 and the ring sleeve 322 of various dimensions can be used in accordance with the dimension of the stick material 70. The inner annular body 32 of the receiving and retaining set 30 can be replaced with the one that is dimensioned to fit over the stick material 70.

What is claimed is:

1. A material holding and guiding device of automatic lathe mounted on a material guiding frame and comprising a base having one end provided with an arm frame and having another end provided horizontally with a reciprocating set coupled with a receiving and retaining set mounted pivotally on said arm frame; wherein said reciprocating set is capable of making a movement causing said receiving and retaining set to make a swing of a predetermined angle by using a pivoting point of said arm frame as a center of motion; wherein said receiving and retaining set has an inner annular body and an outer annular body, with said inner annular body being capable of turning in relation to said outer annular body and with said inner annular body provided axially with a through hole having a diameter greater than a diameter of said material and having two ends, each of which is provided with a ring sleeve of soft plastic material resistant to abrasion and heat; and wherein said movement of said reciprocating set causes said receiving and retaining set to make a swing of a predetermined angle so as to force said ring sleeve of said inner annular body of said receiving and retaining set to hold stably said material in a manner that said material is capable of turning synchronously with said inner annular body.

2. The material holding and guiding device of automatic lathe in accordance with claim 1 wherein said arm frame is provided with a pivoting hole corresponding in location to a round hole provided in each of two sides of said outer annular body of said receiving and retaining set, so that said receiving and retaining set can be mounted securely on said arm frame by means of a pivoting rod passing through said pivoting hole of said arm frame and said round hole of said outer annular body of said receiving and retaining set, with said pivoting rod being held securely in place by means of a stop bolt which interlocks a threaded through hole located over said round hole of said outer annular body.

3. The material holding and guiding device of automatic lathe in accordance with claim 1 wherein said material guiding frame comprises a cross rod provided on both ends thereof with two chain wheels, one of which is driven by a motor; and wherein said material guiding frame further comprises a long chain driven by said two chain wheels and provided thereon with a movable block capable of moving along with said long chain to hit two limit microswitches located respectively on both ends of said cross rod, said long chain being further provided with a pushing member capable of moving along with said long chain so as to push the posterior end of a stick material to cause said stick material to advance.

* * * * *